(12) United States Patent
Lim et al.

(10) Patent No.: US 10,619,995 B2
(45) Date of Patent: Apr. 14, 2020

(54) DIMENSION MEASURING DEVICE AND METHOD

(71) Applicant: POSCO, Pohang-si, Gyeongsangbuk-do (KR)

(72) Inventors: Choong Soo Lim, Pohang-si (KR); Hyeong Jun Huh, Suncheon-si (KR); Sung Joon Kwak, Suncheon-si (KR)

(73) Assignee: POSCO, Pohang-si, Gyeongsangbuk-Do (KR)

( * ) Notice: Subject to any disclaimer, the term of this patent is extended or adjusted under 35 U.S.C. 154(b) by 103 days.

(21) Appl. No.: 15/756,489

(22) PCT Filed: May 25, 2016

(86) PCT No.: PCT/KR2016/005508
§ 371 (c)(1),
(2) Date: Jul. 10, 2018

(87) PCT Pub. No.: WO2017/043732
PCT Pub. Date: Mar. 16, 2017

(65) Prior Publication Data
US 2019/0170504 A1    Jun. 6, 2019

(30) Foreign Application Priority Data
Sep. 10, 2015   (KR) .................. 10-2015-0128223

(51) Int. Cl.
*G01B 11/00* (2006.01)
*G06T 7/50* (2017.01)
*G01B 11/02* (2006.01)
*G01B 11/26* (2006.01)
(Continued)

(52) U.S. Cl.
CPC ............ *G01B 11/022* (2013.01); *G01B 11/00* (2013.01); *G01B 11/026* (2013.01); *G01B 11/04* (2013.01);
(Continued)

(58) Field of Classification Search
CPC .................. G01B 11/22; G06T 7/50
(Continued)

(56) References Cited

U.S. PATENT DOCUMENTS

| | | | |
|---|---|---|---|
| 5,923,428 A | 7/1999 | Woodworth | |
| 2010/0232923 A1* | 9/2010 | Dorner | B21D 43/003 414/776 |

FOREIGN PATENT DOCUMENTS

| | | | |
|---|---|---|---|
| JP | S61-114105 A | 5/1986 | |
| JP | 2013-178103 A | 9/2013 | |

(Continued)

OTHER PUBLICATIONS

International Search Report dated Sep. 26, 2016 issued in International Patent Application No. PCT/KR2016/005508 (with English translation).

(Continued)

*Primary Examiner* — Joseph G Ustaris
*Assistant Examiner* — Amir Shahnami
(74) *Attorney, Agent, or Firm* — Morgan, Lewis & Bockius LLP

(57) ABSTRACT

A dimension measuring device includes: a rail for moving two sheets of material; a plurality of range finders arranged at a preset interval along a direction of traveling of the material, so as to measure a distance from side surfaces of the material; and an imaging device for taking images between the first and second range finders, which are disposed at the first and second locations with reference to the entry side of the material, respectively.

6 Claims, 16 Drawing Sheets

(51) Int. Cl.
*G01B 11/04* (2006.01)
*G01V 8/10* (2006.01)
*G01P 3/68* (2006.01)
*G01S 17/08* (2006.01)
*G01B 11/24* (2006.01)
*G06T 7/60* (2017.01)
*H04N 5/232* (2006.01)

(52) U.S. Cl.
CPC ............ *G01B 11/24* (2013.01); *G01B 11/26* (2013.01); *G01P 3/68* (2013.01); *G01S 17/08* (2013.01); *G01V 8/10* (2013.01); *G06T 7/50* (2017.01); *G06T 7/60* (2013.01); *H04N 5/23203* (2013.01)

(58) Field of Classification Search
USPC .......................................................... 348/88
See application file for complete search history.

(56) References Cited

FOREIGN PATENT DOCUMENTS

| JP | 2014-202597 A | 10/2014 | |
|---|---|---|---|
| JP | 2014202597 A * | 10/2014 | |
| KR | 10-0685039 B1 | 2/2007 | |
| KR | 100685039 B1 * | 2/2007 | ............ B21B 38/04 |
| KR | 10-2013-0036864 A | 4/2013 | |

OTHER PUBLICATIONS

Extended European Search Report dated Jun. 4, 2018 issued in European Patent Application No. 16844552.6.

* cited by examiner

[Figure 1]
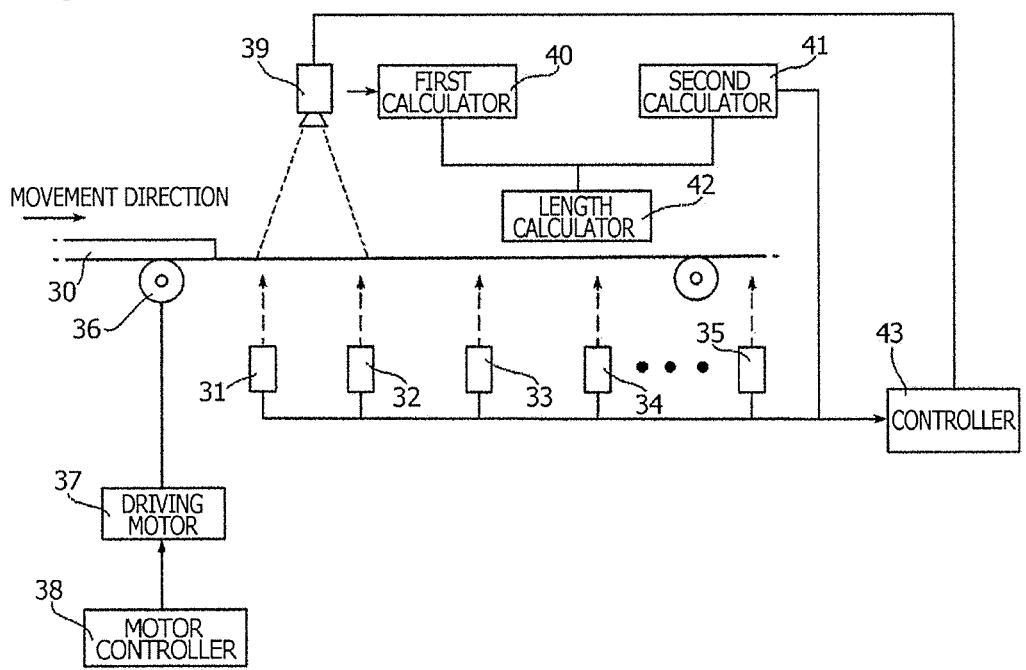

[Figure 2]
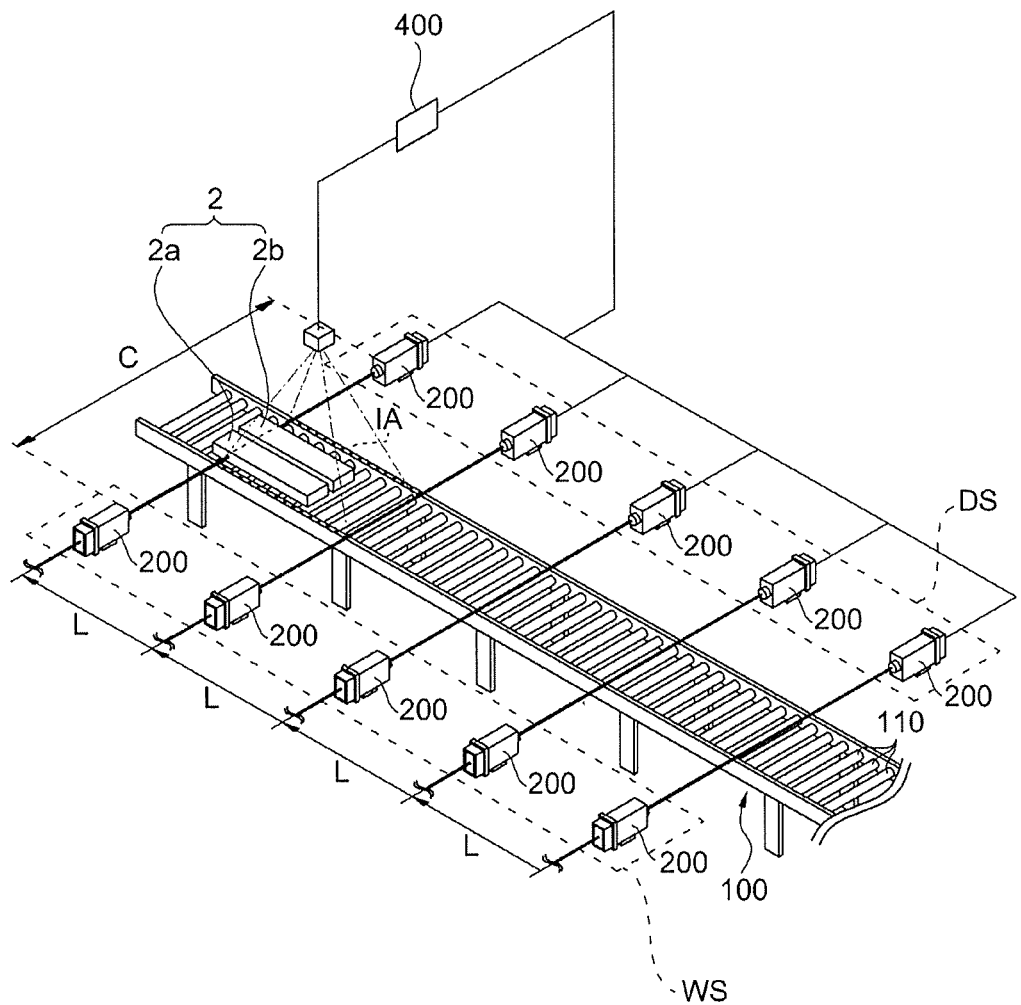
[Figure 3a]
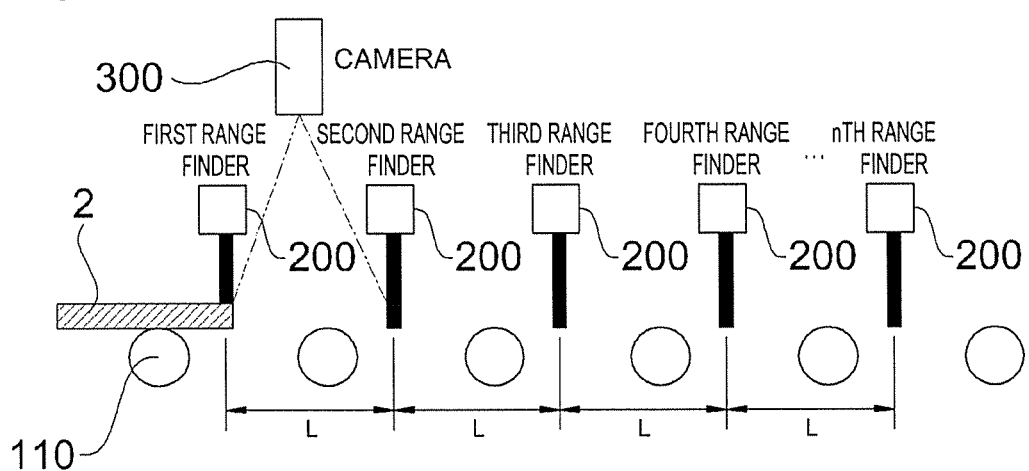

【Figure 3b】
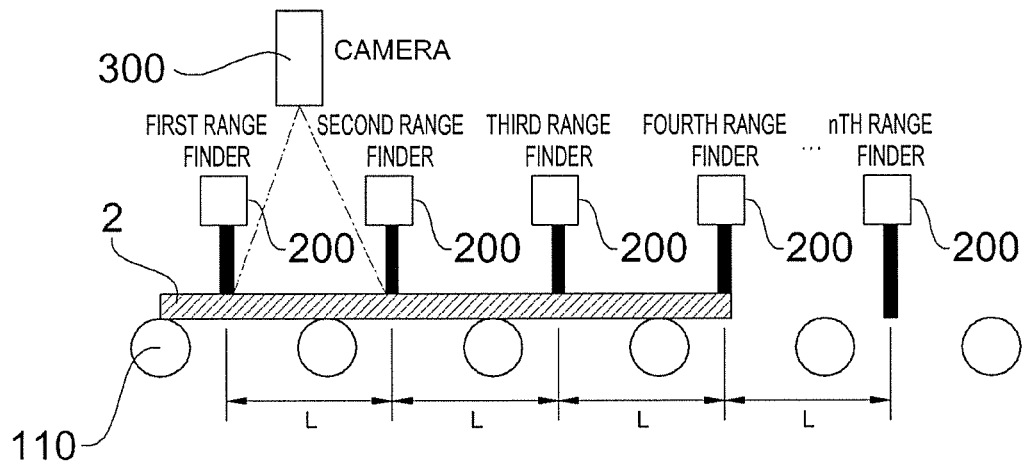
【Figure 3c】
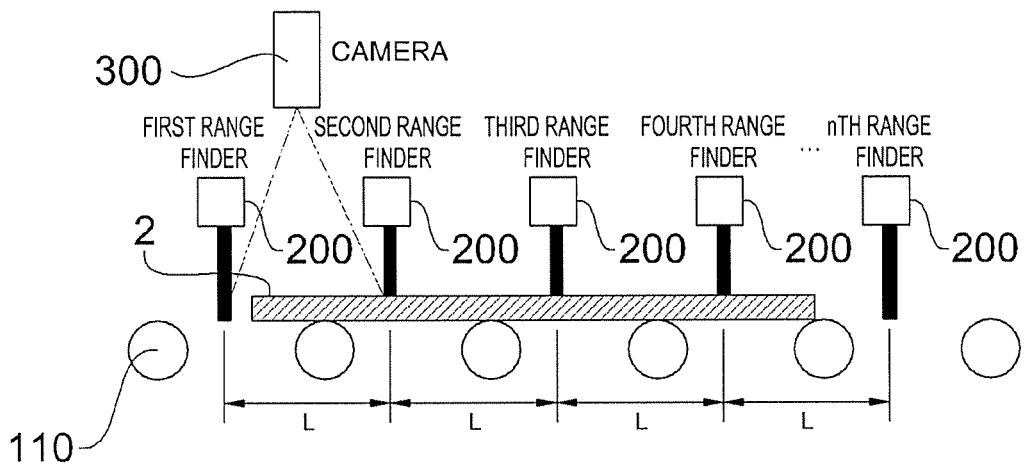
【Figure 3d】
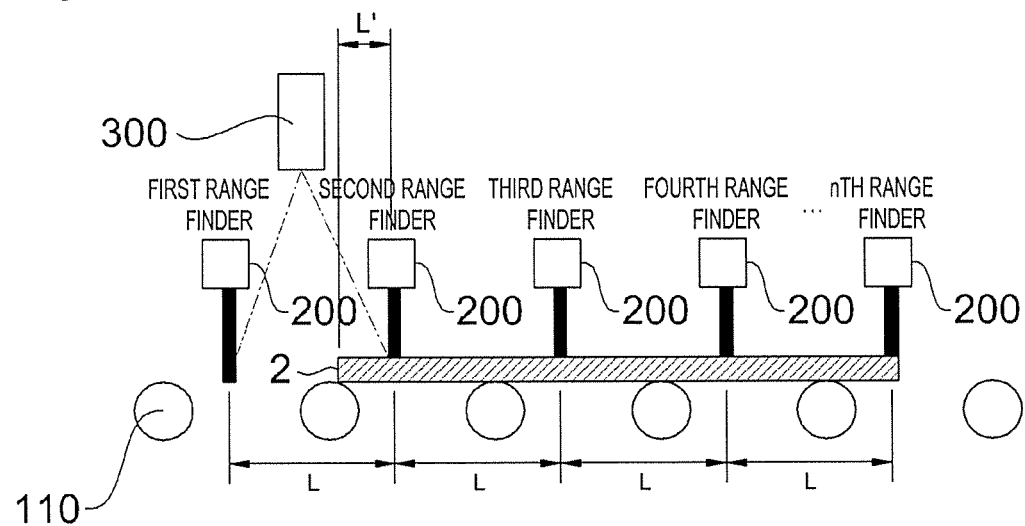

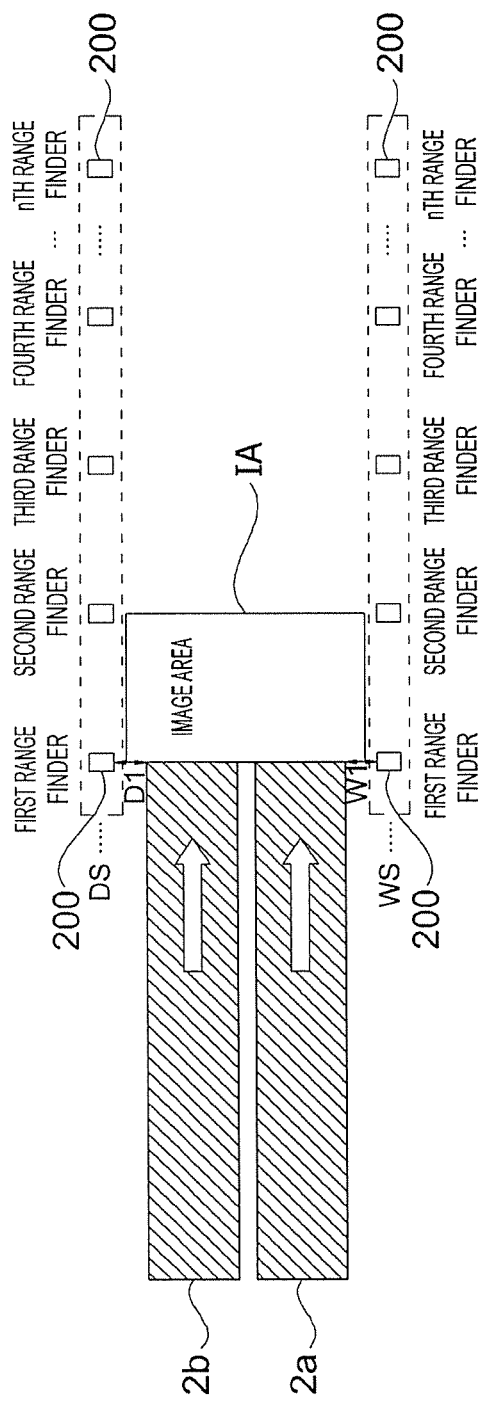
[Figure 4a]

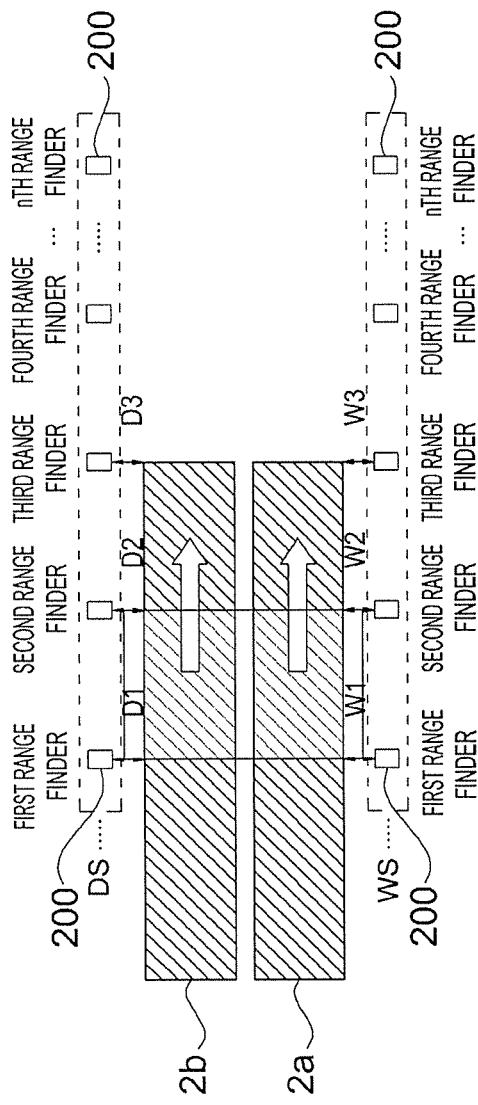

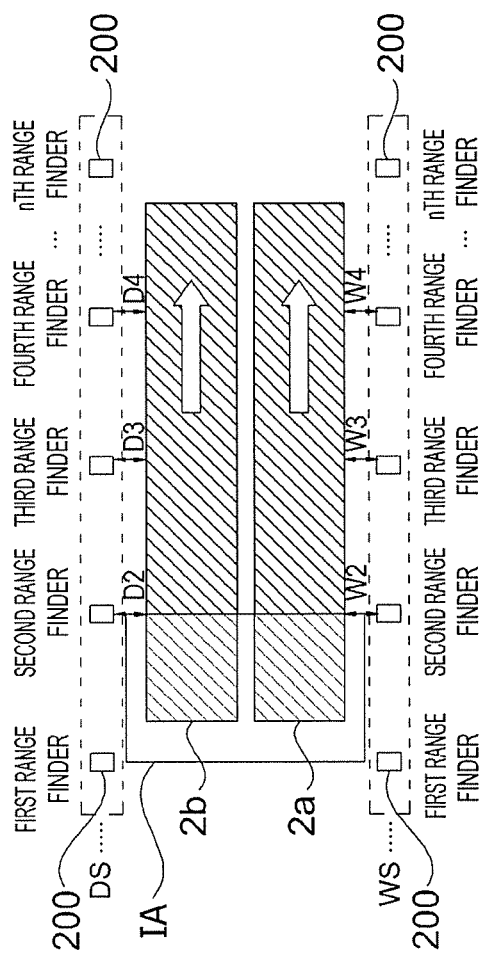
[Figure 4c]

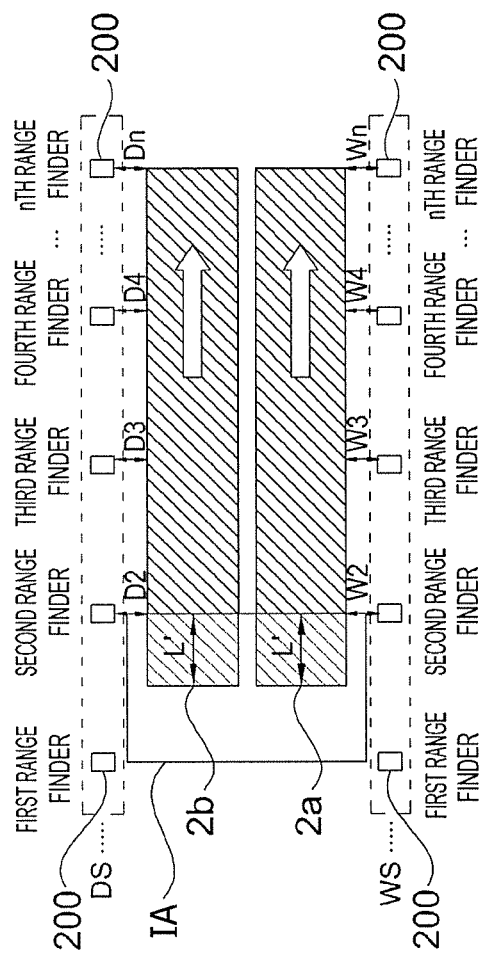
[Figure 4d]

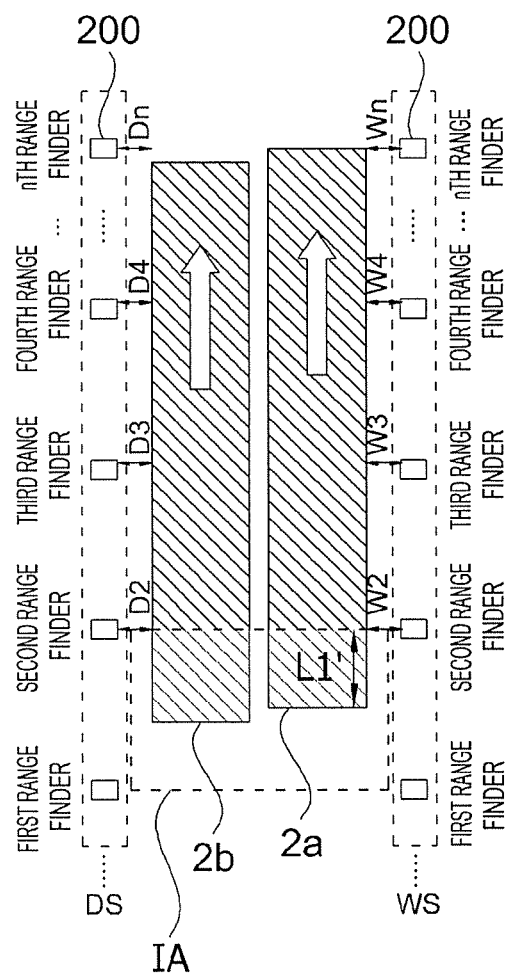
[Figure 5a]

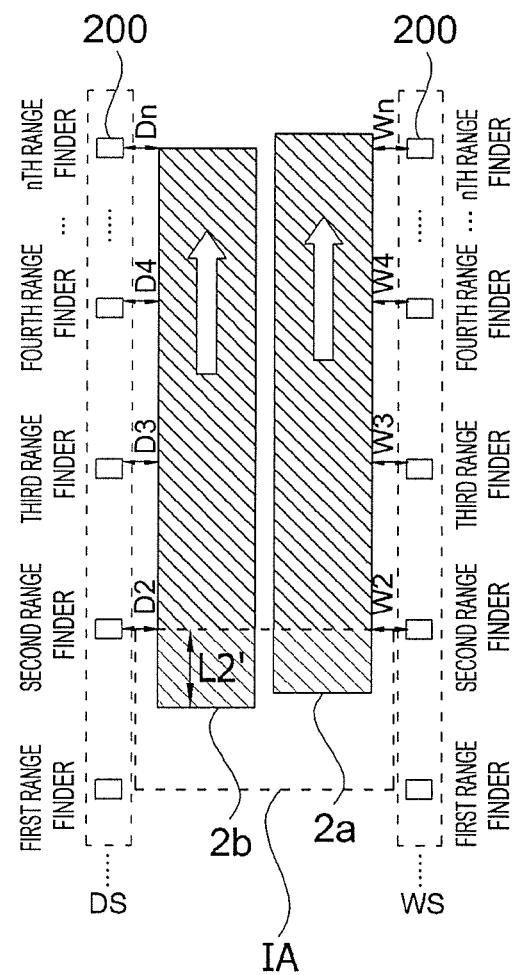
【Figure 5b】

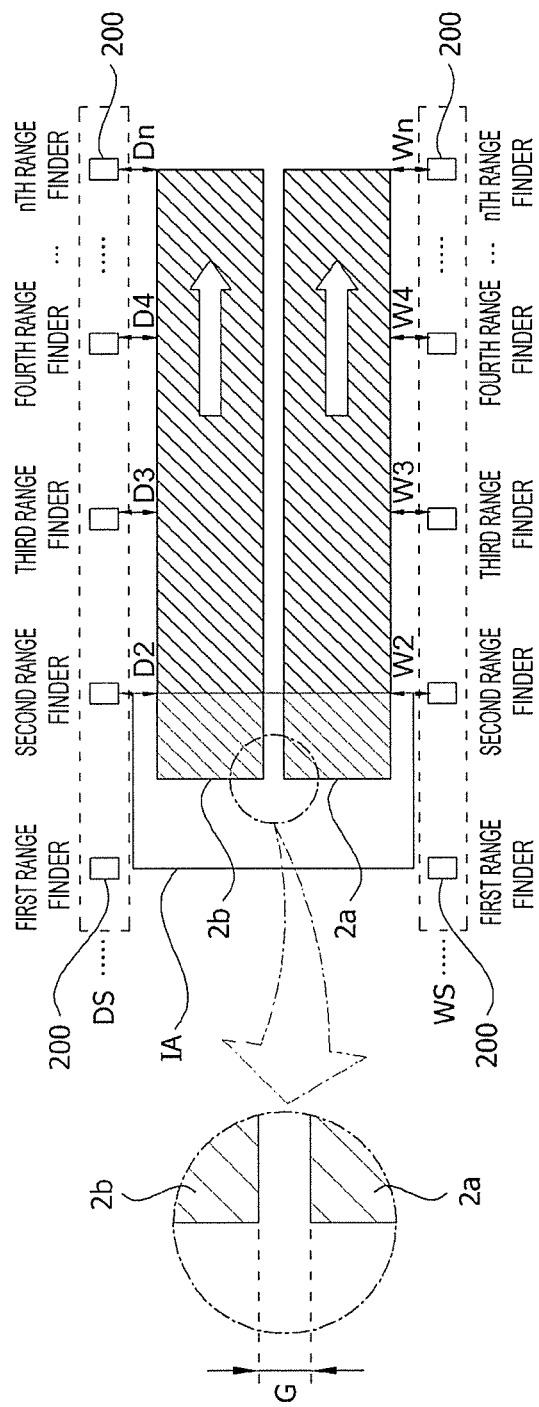
[Figure 6]

[Figure 7]
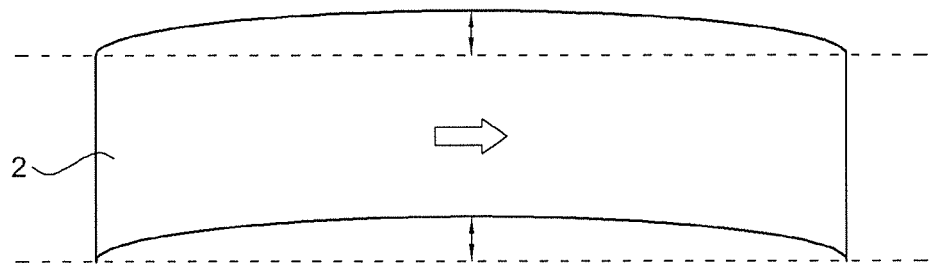
[Figure 8]
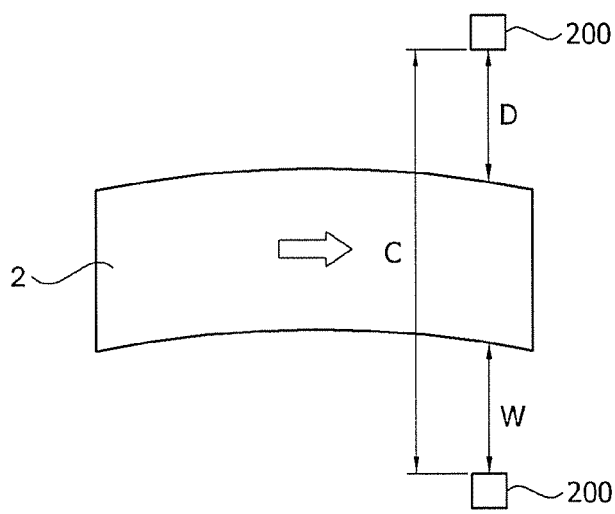
[Figure 9]
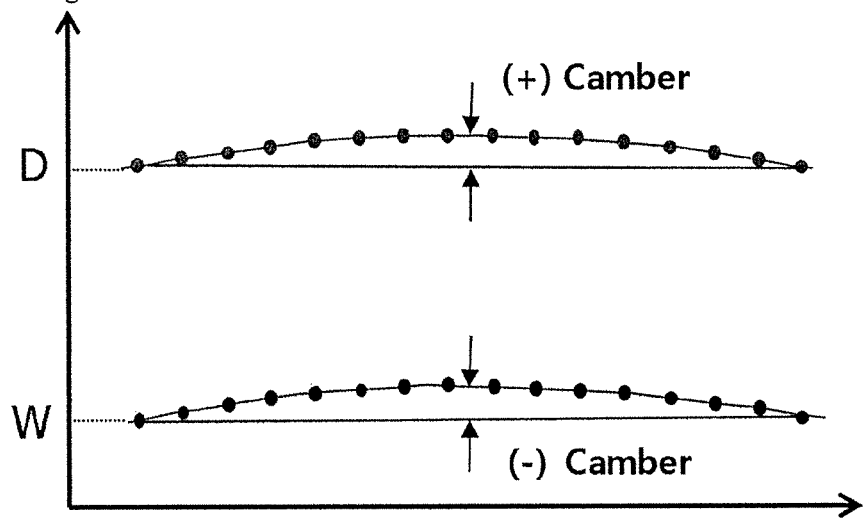

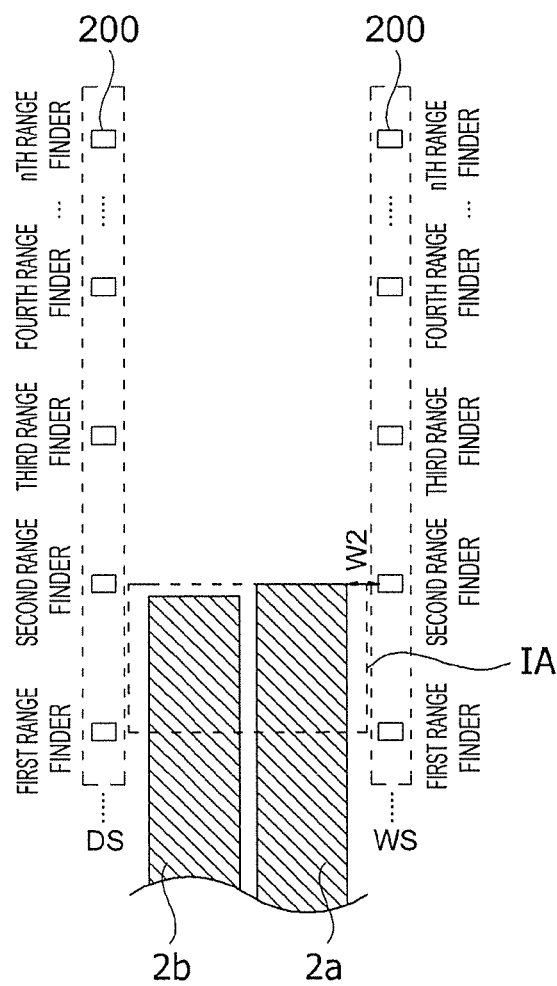

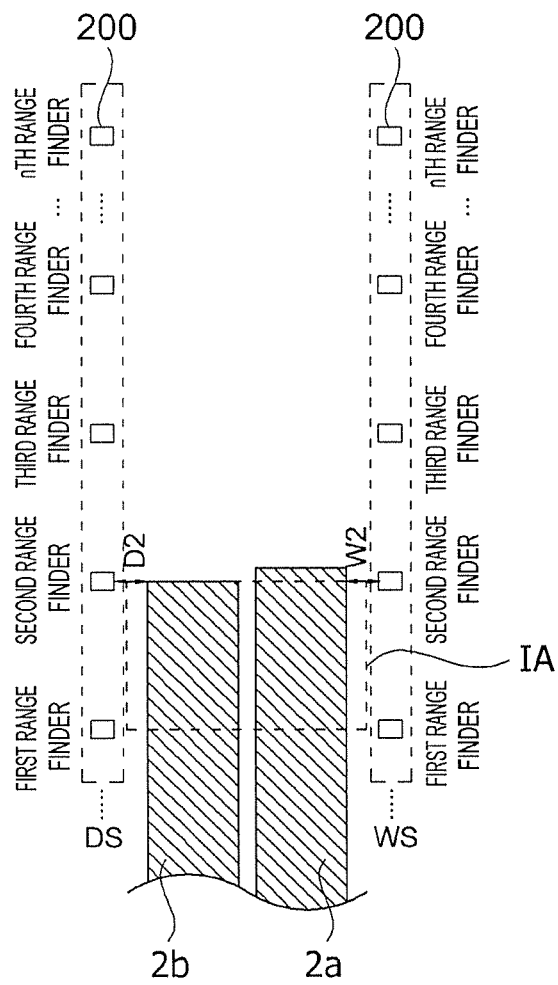
[Figure 10b]

【Figure 11】
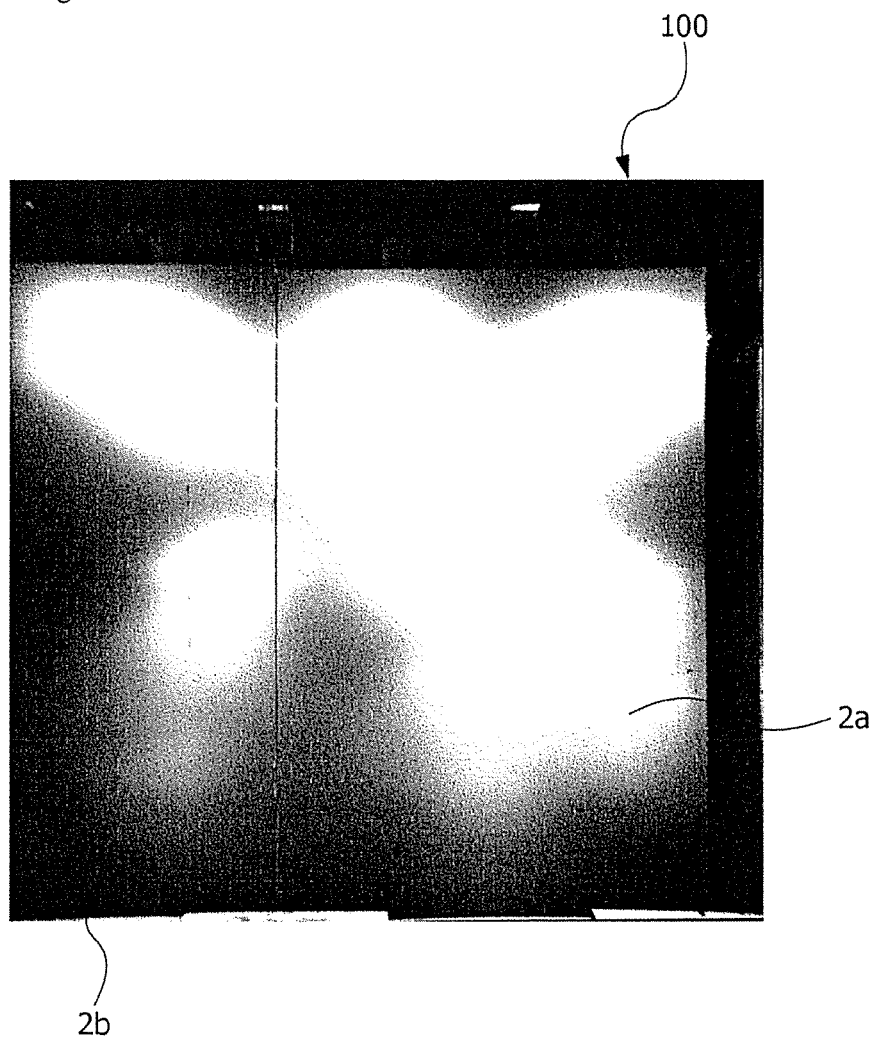

【Figure 12】
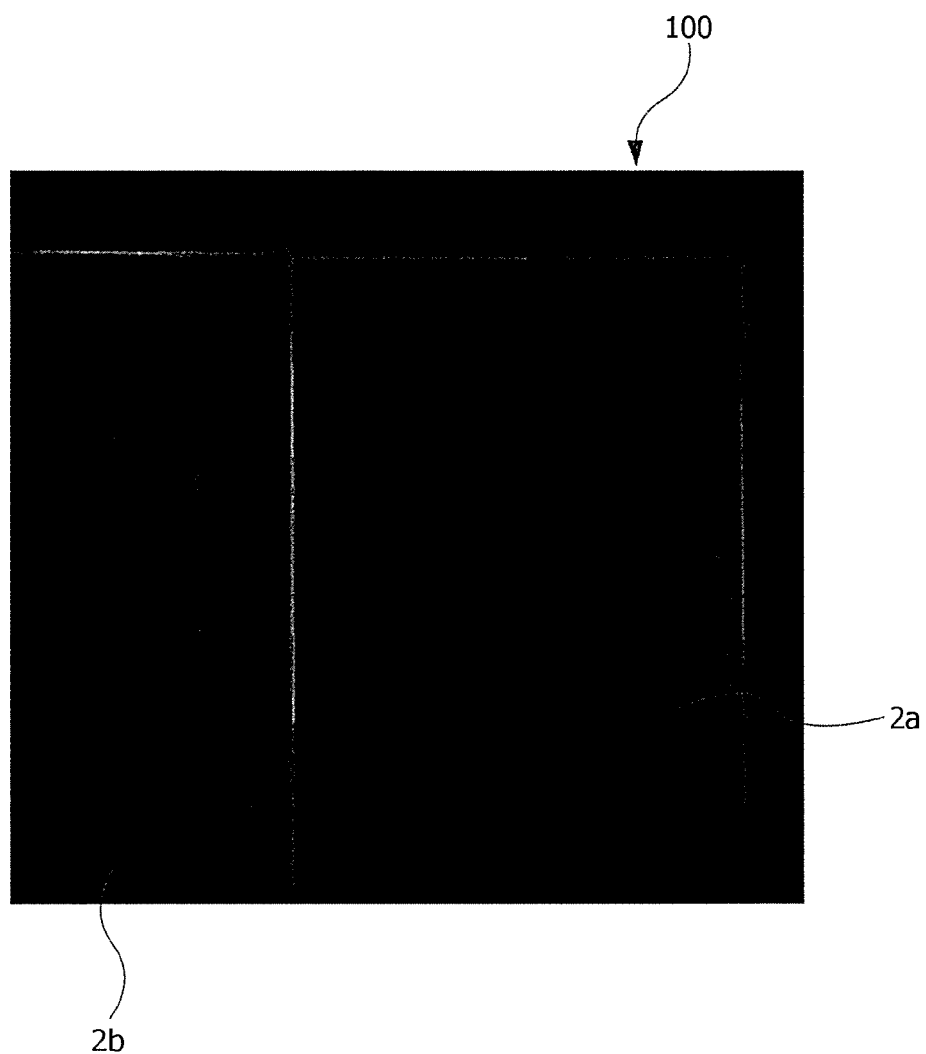

[Figure 13]
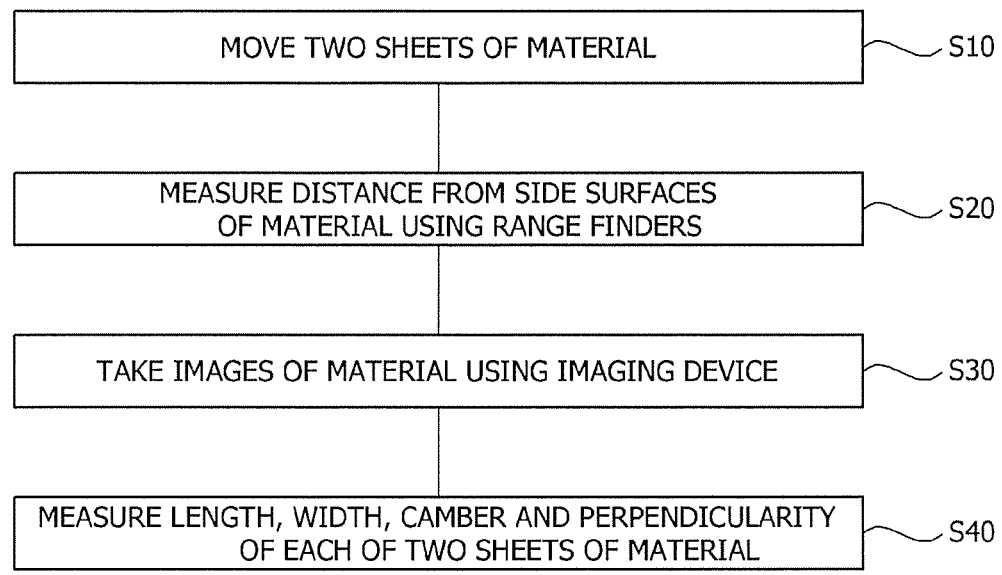

DIMENSION MEASURING DEVICE AND METHOD

CROSS REFERENCE

This patent application is the U.S. National Phase under 35 U.S.C. § 371 of International Application No. PCT/KR2016/005508, filed on May 25, 2016, which claims the benefit of Korean Patent Application No. 10-2015-0128223, filed on Sep. 10, 2015, the entire contents of each are hereby incorporated by reference.

TECHNICAL FIELD

The present invention relates to a dimension measuring device and method. More particularly, the present invention relates to a dimension measuring device for measuring a length, a width and a camber of two sheets of a thick-plate wide-width material using range finders and an imaging device in a product inspection process of a thick plate-manufacturing process, and a dimension measuring method using the same.

BACKGROUND ART

A thick plate is a material having a thickness of approximately 6 mm or more, a width of 1 to 6 m and a length of 4 to 25 m. In order to automatically measure the length and width and a camber of such a thick plate, according to the related art, a laser speedometer and an imaging device for observing a width direction are used.

The speed of material, such as a thick plate, is measured using a speedometer and is integrated according to time so as to measure a length of the material, and images are taken using an imaging device for each predetermined length measured in this way and then the images are connected to one another so that a width and a camber of the material can be measured.

Related inventions include Korean Patent Registration No. 10-0685039 (published on Feb. 13, 2007) by the present applicant, entitled as 'apparatus and method for measuring length of a steel plate'.

Referring to FIG. 1, in the apparatus and method for measuring the length of the steel plate, while the steel plate is moved, a tail end of the steel plate is provided between two metal detectors 31 and 32 provided at an entry side of the steel plate, and in the instance that a front end of the steel plate is detected by another metal detector, images at the tail end of the steel plate can be taken using a camera 39.

A length of the steel plate between the two metal detectors 31 and 32 is calculated using the images at the tail end of the steel plate, and a distance between a second metal detector 32 and a metal detector that detects the front end of the steel plate is added to the calculated length of the steel plate so that the length of the steel plate can be finally calculated.

It is not possible to use the above-mentioned technology in calculation of a length of a thick-plate wide-width material including two sheets.

Referring to FIG. 2, two sheets of a thick-plate wide-width material may be moved parallel to each other based on a traveling direction of the thick-plate wide-width material.

However, because the thick-plate wide-width material can be cut into two sheets in the previous process line thereof and then can be moved at a long distance by a transfer roller, one of the two sheets of the thick-plate wide-width material can be firstly moved.

Thus, a position difference between a front-end portion and a tail-end portion of the two sheets of the thick-plate wide-width material may occur. When a front-end portion of one steel plate is detected and then images are taken at a tail-end portion thereof so as to measure a distance between the front-end portion and the tail-end portion of the one steel plate, like in the technology described in the apparatus and method for measuring the length of the steel plate, a length of each of the two sheets cannot be measured.

In particular, in the apparatus and method for measuring the length of the steel plate, metal detectors are used. Thus, it is difficult to measure dimensions, such as a width and a camber of material.

DISCLOSURE

Technical Problem

The present invention is directed to providing a dimension measuring device and method, whereby dimensions (a width, a camber, a length, and perpendicularity) of each of two sheets of a thick-plate wide-width material while being moved in a thick-plate factory inspection line can be simultaneously and accurately measured.

The problem to be solved is not limited to the above-described problem, and other unmentioned problems will be clearly understood by those skilled in the art from the following description.

Technical Solution

One aspect of the present invention provides a dimension measuring device including: a moving unit for moving two sheets of material; a plurality of range finders installed at a preset interval along a direction of traveling of the material, while being spaced from both side surfaces of the material, so as to measure a distance from the side surfaces of the material; and an imaging device installed to take images between first and second range finders, which are installed at first and second locations based on an entry side of the material, respectively.

The dimension measuring device may further include a controller for controlling the imaging device to take images of the material as the first range finder receives a signal indicating that a tail-end portion of one of the two sheets of the material passes through the first range finder and a front-end portion of the material is detected by an nth range finder installed at an nth location based on the entry side of the material.

A length of the material may be obtained by the following equation:

$$P=(n-2)*L+L',$$

where P is a length of material, L is a distance between range finders, L' is a distance from the second range finder to a tail-end of the material, and n is the number of range finders that detect the material.

A distance from the second range finder to a tail end of the material may be obtained from images taken by the imaging device.

Meanwhile, the controller may receive a signal indicating that a tail-end portion of one of the material that first enters the first range finder passes through the first range finder, may control the imaging device to take images of the material as the front-end portion of the material that first enters the nth range finder is detected by the nth range finder installed at the nth location based on the entry side of the material, and may control the imaging device to take images of the other one of the material as a front-end portion of the other one of the material is detected by the nth range finder.

Also, perpendicularity of the front-end portion of the material may be calculated from images taken by the imaging device as the second range finder detects a front-end portion of one of the material.

Meanwhile, a camber, a width, a length and perpendicularity of each of the two sheets of the material may be measured using distance information continuously measured by one among the range finders arranged along a longitudinal direction of the material and images taken by the imaging device.

The images may be taken as the front-end portion of the material is detected by each of the range finders arranged at a preset interval since the first range finder based on a signal obtained by detecting the front-end portion of the material using the first range finder.

Another aspect of the present invention provides a dimension measuring method including: moving two sheets of material; measuring a distance from side surfaces of the material using a plurality of range finders arranged at a preset interval along a movement direction of the material; taking images of the material using an imaging device; and measuring a length, a width, a camber and perpendicularity of each of the two sheets of the material using distance information measured by the plurality of range finders and images of the material taken by the imaging device.

The measuring of the length, the width, the camber and the perpendicularity of each of the two sheets of the material may include measuring the length, the width, the camber and the perpendicularity of each of the two sheets of the material using distance information continuously measured by one among the range finders and images continuously taken by the imaging device installed to take images between a first range finder and a second range finder installed at first and second locations based on an entry side of the material, respectively.

The images may be taken as a front-end portion of the material is detected by each of the range finders arranged at a preset interval since the first range finder based on a signal obtained by detecting the front-end portion of the material using the first range finder.

Advantageous Effects

In the dimension measuring device having the above configuration according to an embodiment of the present invention, a width, a camber, a length and perpendicularity of two sheets of a thick-plate wide-width material can be simultaneously, individually and accurately measured using a plurality of range finders and an image device.

DESCRIPTION OF DRAWINGS

FIG. 1 is a view of an apparatus and method for measuring a length of a steel plate according to the related art.

FIG. 2 is a view of a dimension measuring device according to an embodiment of the present invention.

FIG. 3 is a view of an operation of measuring a length of a thick-plate wide-width material using the dimension measuring device according to an embodiment of the present invention from a lateral direction.

FIG. 4 is a view of an operation of measuring a length of a thick-plate wide-width material using the dimension measuring device according to an embodiment of the present invention from an upward direction.

FIG. 5 is a view of another embodiment in which a length of each of two sheets of a thick-plate wide-width material in which a position difference between the two sheets of the thick-plate wide-width material occurs, is measured using the dimension measuring device according to an embodiment of the present invention.

FIG. 6 is a view of an operation of acquiring gap position information between two sheets of a thick-plate wide-width material and gap information using an imaging device of the dimension measuring device according to an embodiment of the present invention.

FIG. 7 is a view of a camber of the thick-plate wide-width material.

FIG. 8 is a view of an operation of measuring a camber of the thick-plate wide-width material using the dimension measuring device according to an embodiment of the present invention.

FIG. 9 is a graph showing the result of a measured camber of the thick-plate wide-width material using the dimension measuring device according to an embodiment of the present invention.

FIG. 10 is a view of an operation of measuring perpendicularity of the thick-plate wide-width material using the dimension measuring device according to an embodiment of the present invention.

FIG. 11 is a front-end image of the thick-plate wide-width material taken using the dimension measuring device according to an embodiment of the present invention.

FIG. 12 is a front-end image of the thick-plate wide-width material converted by the dimension measuring device according to an embodiment of the present invention.

FIG. 13 is a flowchart illustrating a dimension measuring method according to an embodiment of the present invention.

MODES OF THE INVENTION

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used here, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined here.

Hereinafter, embodiments will be described in more detail with reference to the accompanying drawings, and those components that are the same or are in correspondence are rendered the same reference numeral regardless of the figure number, and redundant explanations are omitted.

Referring to FIGS. 2 through 12, a dimension measuring device 1 according to an embodiment of the present invention may include a moving unit 100 for moving two sheets of material 2, a plurality of range finders 200 arranged to measure a distance between both side surfaces of the entering material 2, an imaging device 300, and a controller 400. Here, a thick-plate wide-width material may be used as the material 2 to be measured. The plurality of range finders 200 may be installed along a direction of traveling of the material 2, while being spaced from the material 2.

The moving unit 100 may include a plurality of rollers 110, as illustrated in FIG. 2. The two sheets of the material 2 that enter while being arranged parallel to each other due to the plurality of rotating rollers 110, are moved in one direction.

That is, the material 2 is moved along a direction of entry due to the rollers 110, after entering due to the moving unit 100. For example, because the thick-plate wide-width material is cut in two sheets in the previous process line thereof and then is moved by the rollers 110, the two sheets may be moved by the moving unit 100 parallel to each other, as illustrated in FIG. 2.

The plurality of range finders 200 are installed to measure a distance between both side surfaces of the entering material 2 and the range finders 200 while being spaced a predetermined distance apart from the material 2. Here, laser range finders may be used as the range finders 200.

As illustrated in FIG. 2, the range finders 200 may be divided into a work side range finder part WS installed at the right side of the material 2 based on a direction of entry of the material while being spaced apart from the material 2, and a drive side range finder part DS installed at the left side of the material 2 based on the direction of entry of the material while being spaced apart from the material.

The work side range finder part WS and the drive side range finder part DS may be installed to face each other in a state in which the entering material 2 is interposed between the work side range finder part WS and the drive side range finder part DS. That is, the range finders 200 installed at the work side range finder part WS and the drive side range finder part DS may be installed to face each other at a preset installation interval C, as illustrated in FIG. 2.

Also, a plurality of range finders 200 may be installed at each of the work side range finder part WS and the drive side range finder part DS along an entry direction of the material 2 while being spaced apart from one another at a preset interval L.

Thus, a plurality of, i.e., first, second, third, . . . , and nth range finders 200 may be installed at each of the work side range finder part WS and the drive side range finder part DS based on an entry side of the material 2.

The imaging device 300 may be installed so as to take images of the material 2 when the material 2 is moved, while being spaced apart from an upper portion of the moving unit 100. For example, the imaging device 300 may be a camera installed to take images between a first range finder and a second range finder.

That is, the imaging device 300 may be installed to take images in an image area IA between the first range finder and the second range finder.

As illustrated in FIG. 2, the imaging device 300 according to the present invention is installed to take images in the image area IA between the first range finder and the second range finder. However, embodiments are not limited thereto, and a plurality of imaging devices 300 may be installed along a direction of movement of the material 2 while being spaced apart from one another at a preset interval. Thus, the plurality of imaging devices 300 may take images in all areas of the moved material 2.

The controller 400 may control the range finders 200 and the imaging device 300. Thus, the controller 400 may be electrically connected to the range finders 200 and the imaging device 300.

Also, the controller 400 may receive signals to be transmitted to include measurement information measured from the range finders 200 and the imaging device 300 and may measure shape such as a length, a width, a camber, and perpendicularity of the material 2, based on the measurement information. The controller 400 may allow a user to perceive a measured measurement value using a display device (not shown).

Hereinafter, a method of measuring the length of the material 2 will be described with reference to FIGS. 2 and 5. Here, the imaging device 300 may be installed to take images between the first range finder and the second range finder, as illustrated in FIG. 2.

Also, in description of the present invention, the material 2 to be moved while being located at the right side based on the movement direction of the material 2 will be referred to as a fixing unit material 2a, and the material 2 to be moved while being located at the left side based on the movement direction of the material 2 will be referred to as a moving unit material 2b.

FIG. 3 is a view of an operation of measuring a length of a thick-plate wide-width material using the dimension measuring device according to an embodiment of the present invention from a lateral direction, and FIG. 4 is a view of an operation of measuring a length of a thick-plate wide-width material using the dimension measuring device according to an embodiment of the present invention from an upward direction.

In more detail, FIGS. 3A and 4A illustrate a case where a front-end portion of a material enters a first range finder, and FIGS. 3B and 4B illustrate a state before a tail-end portion of the material enters the first range finder, and FIGS. 3C and 4C illustrate a state after the tail-end portion of the material enters the first range finder, and FIGS. 3D and 4D illustrate a case where, after the tail-end portion of the material enters the first range finder, the front-end portion of the material enters an nth range finder.

As illustrated in FIGS. 3A and 4A, the fixing unit material 2a and the moving unit material 2b to be moved parallel to each other enter the first range finder of the dimension measuring device 1. Thus, the controller 400 initializes the dimension measuring device 1.

As illustrated in FIGS. 3B and 4B, the front-end portion of the material 2 sequentially passes through a second range finder and a third range finder of the dimension measuring device 1.

As illustrated in FIGS. 3C and 4C, the tail-end portion of the material 2, i.e., an end portion of the material 2 passes through the first range finder, and the first range finder transmits a trigger signal indicating that the tail-end portion of the material 2 passes through the first range finder, to the controller 400.

As illustrated in FIGS. 3D and 4D, when the front-end portion of the material 2 is detected by the nth range finder based on the trigger signal of the first range finder, the controller 400 controls the imaging device 300 to take images of the material 2.

Thus, a length P of the material 2 may be obtained using the following Equation 1.

$$P=(n-2)*L+L',\qquad\text{[Equation 1]}$$

where P is a length of material, L is a distance between range finders, L' is a distance from the second range finder to a tail-end of the material, and n is the number of range finders that detect the material.

FIG. 5 is a view of another embodiment in which a length of each of two sheets of a thick-plate wide-width material in which a position difference between the two sheets of the thick-plate wide-width material occurs, is measured using the dimension measuring device according to an embodiment of the present invention. In more detail, FIG. 5A is a view of a case where a front-end portion of a fixing unit material is detected by an nth range finder, and FIG. 5B is a view of a case where a front-end portion of a moving unit material is detected by the nth range finder.

Meanwhile, a method of measuring a length of each of the fixing unit material 2a and the moving unit material 2b when a position difference between the front-end portion and the tail-end portion of two sheets of the material 2 occurs, will be described with reference to FIG. 5. For example, because the thick-plate wide-width material is cut into two sheets in the previous process line and then is moved by the rollers 110, the position difference between the front-end portion and the tail-end portion of the fixing unit material 2a and the moving unit material 2b is not large compared to the length of the material 2, as illustrated in FIG. 5.

When the fixing unit material 2a and the moving unit material 2b enter so that a predetermined position difference between the front-end portion and the tail-end portion of the fixing unit material 2a and the moving unit material 2b occurs, the case where the fixing unit material 2a enters prior to the moving unit material 2b, as illustrated in FIG. 5, will be described as an example.

When the tail-end portion of the fixing unit material 2a is detected by the first range finder, the first range finder transmits a trigger signal indicating that the tail-end portion of the material 2 passes through the first range finder, to the controller 400. The controller 400 controls the nth range finder to detect the front-end portion of the fixing unit material 2a based on the trigger signal of the first range finder. As illustrated in FIG. 5A, when the nth range finder at a work side range finder part WS detects the front-end portion of the fixing unit material 2a, the controller 400 controls the imaging device 300 to take images at the tail-end portion of the fixing unit material 2a.

Thus, a length of the fixing unit material 2a (P1= ((n−2)*L+L1') may be obtained by the above Equation 1.

Also, as illustrated in FIG. 5B, when the front-end portion of the moving unit material 2b is detected by the nth range finder at a drive side range finder part DS, the controller 400 controls the imaging device 300 to take images at the tail-end portion of the moving unit material 2b.

Accordingly, a length of the fixing unit material 2a (P2=((n−2)*L+L2') may be obtained by the above Equation 1.

Thus, the controller 400 of the dimension measuring device 1 receives the trigger signal indicating that a tail-end portion of one of the material 2 that first enters the first range finder passes through the first range finder, and controls the imaging device 300 to take images of the material 2 as the front-end portion of the material 2 that first enters the nth range finder installed at an nth location based on the entry side of the material 2 is detected.

Images at a tail-end portion of the other one of the material 2 are taken using the imaging device as a front-end portion of the other one of the material 2 is detected by the nth range finder so that the dimension measuring device can measure a length of each of the fixing unit material 2a and the moving unit material 2b.

That is, the dimension measuring device 1 may measure a length of each of the fixing unit material 2a and the moving unit material 2b using the range finders 200 and the imaging device 300. Thus, the dimension measuring device 1 may measure a length of each of the fixing unit material 2a and the moving unit material 2b simultaneously without a stoppage of the material 2 so that productivity can be improved.

Also, as the front-end portion of the material 2 is detected by each range finder since the first range finder based on the trigger signal, the imaging device 300 of the dimension measuring device 1 may take images of the material 2 and may analyze the continuously-taken images to measure and verify a length of the measured material 2.

A method of measuring a width and a camber of each of the fixing unit material 2a and the moving unit material 2b using the dimension measuring device 1 will be described with reference to FIGS. 4, 6, and 7.

A range finder 200 at a work side range finder part WS and a range finder 200 at a drive side range finder part DS that faces the range finder 200 at the work side range finder part WS may be installed at a preset installation interval C. Thus, the installation interval C may have a preset value, and the range finder 200 at the work side range finder part WS and the range finder 200 at the drive side range finder part DS that faces the range finder 200 at the work side range finder part WS may measure the distance from side surfaces of the material 2 to acquire distance information.

Also, the imaging device 300 of the dimension measuring device 1 may take images of the material 2 as the front-end portion of the material 2 is detected by each range finder since the first range finder based on the trigger signal indicating that the front-end portion of the material 2 passes through the first range finder.

The controller 400 of the dimension measuring device 1 may analyze a plurality of images taken to acquire information about a gap (G) between the fixing unit material 2a and the moving unit material 2b and position information (position information of a central cutting portion) of the gap (G).

Thus, the dimension measuring device 1 may obtain a width of each of the fixing unit material 2a and the moving unit material 2b using the distance information of the fixing unit material 2a and the moving unit material 2b measured using the range finders 200, the position information about the gap (G), and the gap (G) information.

For example, a width of the fixing unit material 2a may be obtained using the position information of a gap (G) at the installation interval C between the range finders 200 that face each other, gap (G) information, and distance information from the range finder 200 at the work side range finder part WS to side surfaces of the fixing unit material 2a.

Also, referring to FIGS. 7 through 9, a camber of the material 2 may be calculated from measured values of the both-side range finders 200, the central cutting portion position acquired by image analysis, and the gap (G) information. Here, the camber of the material 2 may be defined as a degree of bending of a width based on the movement direction of the material 2, as illustrated in FIG. 7.

One of the range finders 200 may detect front- and tail-end portions of the material 2 which is being moved and simultaneously may continuously measure the position of both side surfaces of the material 2, as illustrated in FIG. 8.

When distance data about both side surfaces of the material 2 measured by the range finder 200 in a longitudinal direction with respect to the material 2 is used, the entire camber amount of the material 2 may be calculated, as illustrated in FIG. 9.

Also, images of the material 2 may be continuously taken using the imaging device 300 while the material 2 is moved, and the gap (G) position information and the gap (G) information (gap change amount) may be measured in the longitudinal direction of the material 2 through image analysis, as described above. Thus, when the distance data about both side surfaces of the material 2 is used together, a camber amount of each of the fixing unit material 2a and the moving unit material 2b may also be measured.

Also, even when precise measurement of the camber amount is not necessary in the dimension measuring device 1, the camber amount may also be directly and simply measured using distance data Dn, Wn, . . . , D2, and W2 measured simultaneously at the same instance as that of FIGS. 3D and 4D and images taken at the tail-end portion of the material 2.

FIG. 10 is a view of an operation of measuring perpendicularity of the thick-plate wide-width material using the dimension measuring device according to an embodiment of the present invention, FIG. 11 is a front-end image of the thick-plate wide-width material taken using the dimension measuring device according to an embodiment of the present invention, and FIG. 12 is a front-end image of the thick-plate wide-width material converted by the dimension measuring device according to an embodiment of the present invention.

In more detail, FIG. 10A is a view of a case where a front-end portion of a fixing unit material is detected by a second range finder, and FIG. 10B is a view of a case where a front-end portion of a moving unit material is detected by the second range finder.

Hereinafter, a method of measuring perpendicularity of the front-end portion of the material 2 will be described with reference to FIGS. 10 through 12. Here, FIGS. 11 and 12 illustrate images indicating perpendicularity of the fixing unit material 2a and converted images (edge portion thinning).

Referring to FIG. 10A, when the front-end portion of the fixing unit material 2a is detected by a first range finder, the first range finder transmits a trigger signal indicating that the front-end portion of the material 2 passes through the first range finder, to the controller 400. The controller 400 controls the second range finder to detect the front-end portion of the fixing unit material 2a based on the trigger signal of the first range finder.

When the front-end portion of the fixing unit material 2a is detected by the second range finder, the controller 400 controls the imaging device 300 to take images at the front-end portion of the fixing unit material 2a.

Thus, the dimension measuring device 1 may acquire and convert images at the front-end portion of the fixing unit material 2a to calculate perpendicularity of the fixing unit material 2a, as illustrated in FIGS. 11 and 12.

Also, as illustrated in FIG. 10B, when the second range finder at the drive side range finder part DS detects the front-end portion of the moving unit material 2b, the controller 400 controls the imaging device 300 to take images at the front-end portion of the moving unit material 2b. The dimension measuring device 1 may acquire and convert images at the front-end portion of the moving unit material 2b to calculate perpendicularity of the moving unit material 2b.

Hereinafter, a dimension measuring method according to an embodiment of the present invention will be described with reference to FIG. 13. In this case, same reference numerals are used for the same elements as those of the dimension measuring device 1. Thus, a detailed description thereof will be omitted.

A dimension measuring method S1 may include: moving two sheets of material (S10); measuring a distance from side surfaces of the material using a plurality of range finders arranged along a movement direction of the material at a preset interval (S20); taking images of the material using an imaging device (S30); and measuring a length, a width, a camber and perpendicularity of each of the two sheets of the material using distance information measured by the plurality of range finders and the images of the material taken by the imaging device (S40).

In Operation S40 of measuring the length, the width, the camber and the perpendicularity of each of the two sheets of the material, the length, the width, the camber and the perpendicularity of each of the two sheets of the material may be measured using distance information continuously measured by one among the range finders 200 and the images continuously taken by the imaging device 300.

Here, the imaging device 300 may be installed to take images between the first range finder and the second range finder installed at a first location and a second location based on the entry side of the material 2, respectively.

In this case, the images may be taken as the front-end portion of the material 2 is detected by each of the range finders 200 arranged since the first range finder based on a signal obtained by detecting the front-end portion of the material 2 using the first range finder.

While the present invention has been shown and described with reference to certain exemplary embodiments thereof, it will be understood by those skilled in the art that various changes in form and details may be made therein without departing from the spirit and scope of the invention as defined by the appended claims.

EXPLANATIONS OF REFERENCE NUMERALS

1: dimension measuring device, 2: material, 100: moving unit, 200: range finder, 300: imaging device, 400: controller, WS: work side range finder part, DS: drive side range finder part

The invention claimed is:

1. A dimension measuring device comprising:
   a rail for moving two sheets of material in parallel;
   a plurality of range finders arranged at a preset interval along a direction of traveling of the material, while being spaced from both side surfaces of the material, so as to measure a distance from the side surfaces of the material;
   an imaging device for taking images between first and second range finders, which are disposed at first and second locations based on an entry side of the material, respectively; and
   a controller for controlling the imaging device to take images of the material as the first range finder receives a signal indicating that a tail-end of one of the two sheets of the material passes through the first range finder and a front-end of the one of the two sheets of the material is detected by an nth range finder disposed at an nth location based on the entry side of the material, and
   wherein a length of each of the two sheets of the material is obtained by the following equation:

$$P=(n-2)*L+L',$$

where P is the length of each of the two sheets of the material, L is a distance between each of the plurality of range finders, L' is a distance from the second range finder to a tail-end of each of the two sheets of the material, and n is a number of the plurality of range finders that detect the material.

2. The dimension measuring device of claim 1, wherein the distance from the second range finder to the tail-end of each of the two sheets of the material is obtained from images taken by the imaging device.

3. The dimension measuring device of claim 1, wherein the controller:
   receives a signal indicating that the tail-end of the one of the two sheets of the material that first enters the first range finder passes through the first range finder,
   controls the imaging device to take images of the material as the front-end of the one of the two sheets of the material that first enters the nth range finder is detected by the nth range finder disposed at the nth location based on the entry side of the material, and
   controls the imaging device to take images of the other one of the two sheets of the material as a front-end of the other one of the two sheets of the material is detected by the nth range finder.

4. The dimension measuring device of claim 1, wherein perpendicularity of the front-end of the one of the two sheets of the material is calculated from images taken by the imaging device as the second range finder detects the front-end of the one of the two sheets of the material.

5. The dimension measuring device of claim 1, wherein a camber, a width, a length and perpendicularity of each of the two sheets of the material are measured using distance information continuously measured by one among the plurality of range finders arranged along a longitudinal direction of the material and images taken by the imaging device.

6. The dimension measuring device of claim 5, wherein images are taken as the front-end of one of the two sheets of the material is detected by each of the plurality of range finders that are arranged at the preset interval based on a signal obtained by detecting the front-end of the one of the two sheets of the material using the first range finder.

* * * * *